(No Model.)

D. HIGHAM.
REGULATION OF ELECTRIC MOTORS.

No. 379,466. Patented Mar. 13, 1888.

Witnesses:
W. D. Conner.
D. S. Williams.

Inventor
Daniel Higham
by his Attorneys
Howson Son

N. PETERS, Photo-Lithographer, Washington, D. C.

UNITED STATES PATENT OFFICE.

DANIEL HIGHAM, OF PHILADELPHIA, PENNSYLVANIA, ASSIGNOR TO THE HIGHAM ELECTRIC MOTOR COMPANY, OF SAME PLACE.

REGULATION OF ELECTRIC MOTORS.

SPECIFICATION forming part of Letters Patent No. 379,466, dated March 13, 1888.

Application filed June 29, 1887. Serial No. 242,839. (No model.)

*To all whom it may concern:*

Be it known that I, DANIEL HIGHAM, a citizen of the United States, and a resident of Philadelphia, Pennsylvania, have invented certain Improvements in the Regulation of Electric Motors, of which the following is a specification.

My invention relates to the construction of electric motors, more especially such as are supplied with currents of constant potential.

The main object of my invention is to so construct the motor as to provide for both automatic regulation and automatic maintenance of the non-sparking points.

Figure 1:
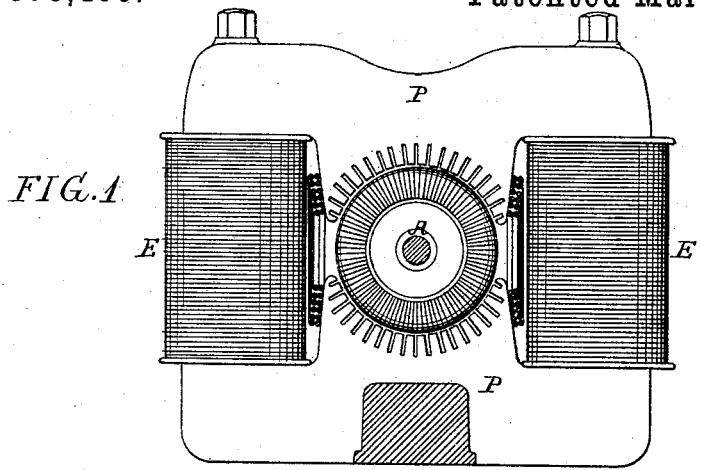

In the accompanying drawings, Figure 1 represents in side view a motor constructed in accordance with my invention, the armature-shaft and bearing-post being in section; and Figs. 2 to 5, inclusive, are diagrams illustrating my invention.

In each of the diagrams the line $a\ a$ indicates the line of neutrality in the magnetic field, while the line $b\ b$ indicates the line of commutation.

A is the armature and P the poles of the field-magnets E, Fig. 1.

Figure 2:
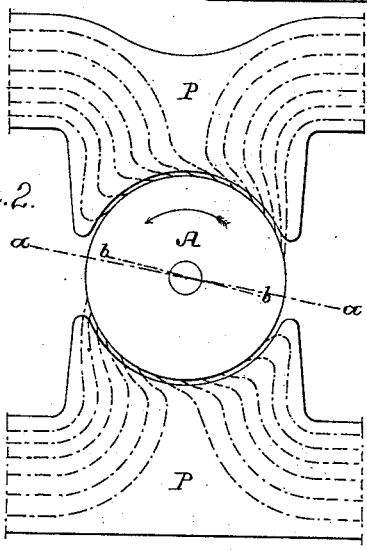
Figure 3:
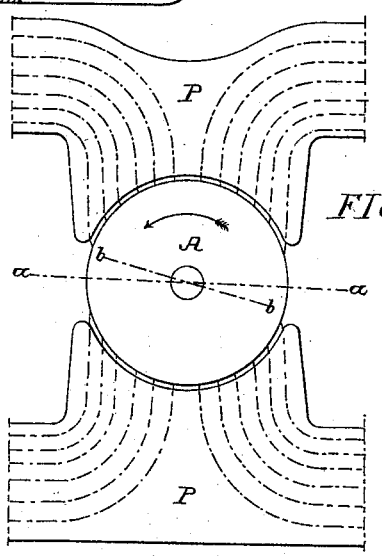

In the ordinary simple form of motor there is a diversion of the magnetic lines in the poles or pole-pieces of the field-magnet, which is due to their close proximity to the armature-coils. Detriments resulting from this diversion I have already pointed out in my applications for patents, Serial Nos. 219,614 and 236,752; but in the present application I shall point out and describe further detriments resulting from this diversion of the magnetic lines. Fig. 2 represents this diversion of the magnetic lines and the consequent distortion of the magnetic field in the ordinary or simple form of motor when working under load, the commutator-brushes being adjusted, of course, to the point of least sparking, as indicated by the line $b\ b$, which is slightly behind the line $a\ a$, or the line of neutrality in the magnetic field. Now it is plainly evident that when the load is reduced the distortion of the magnetic field becomes less perceptible, owing to the reduction of the armature-current, (the motor being, of course, supposed to be supplied from mains of constant potential,) and when the load is removed entirely there will be practically no distortion of the magnetic field, owing to the armature-current coming very near to zero. This non-distortion of the magnetic field, when the motor is running without load, is illustrated in Fig. 3, and, for the sake of clearness in illustration, the density of the magnetic field is represented as having remained constant, the magnetic field resulting from the armature current not being taken into consideration. The field-magnets may be supposed to be shunt-excited. By a comparison of these two Figs. 2 and 3 the resulting detriments of the distortion of the magnetic field can be plainly seen. In the condition shown in Fig. 3 the magnetic field has shifted back, (or shifted in the direction of rotation of the armature,) so that the commutator-brushes which have remained fixed are no longer adjusted to the points of least sparking, and consequently destructive sparking ensues. Furthermore, not only are some of the magnetic lines used in producing this sparking, but some of the lines even pass over the short-circuited armature coils and pass through coils which should be in the opposite field, whereby the effective counter electro-motive force of the remaining coils is greatly reduced. It then becomes necessary for the machine to race considerably, in order to produce sufficient counter electro-motive force to limit the necessary flow of current to the armature.

In my former applications I have set forth means whereby the distortion of the magnetic field could be effectually prevented; but these means (namely, laminating the field-magnet pole-pieces transversely to the direction of rotation of the armature, or, in other words, to the magnetic action of the armature-current) will not prevent sparking nor effect regulation, but would, however, both reduce and assist them, for the sparking is not wholly due to the shifting of the magnetic field, but also to the self-induction of the armature-coils, while as to the defect in the automatic regulation, that is due to both the magnetic field set up by the armature-current and to the (copper) resistance of the armature-coils. I therefore combine with these laminations electro-magnetic coils or circuits, whereby the magnetic field will not only be automatically prevented from shifting, but will be shifted in opposition to the magnetic action of the armature-current.

In my present invention the electro-magnetic coils or circuits which I combine with the laminations are applied to the field-magnet pole-pieces only, as described, for instance, in my applications for patents, Serial Nos. 229,778 and 237,578.

Another type of distorting coils or circuits applied to the cores of double-circuit field-magnets forms the subject of a separate application filed of even date herewith.

Figure 4:
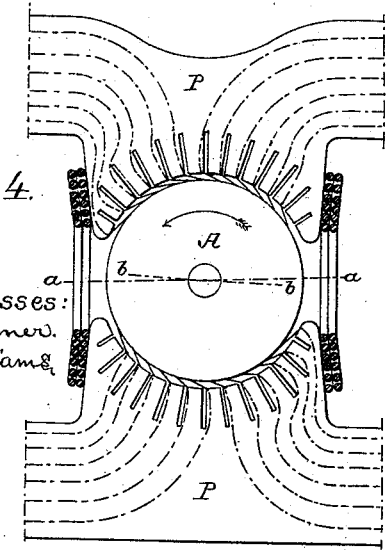
Figure 5:
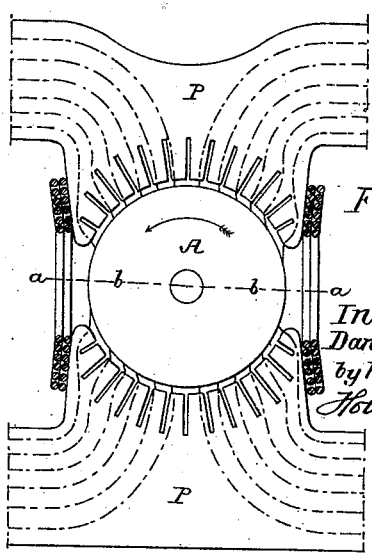

Figs. 4 and 5 represent diagrammatically my preferred construction of pole-piece and arrangement of pole-piece coils, Fig. 4 showing the form of the magnetic lines when working under load. From this it will be seen that the magnetic field is slightly shifted by the magnetic action of the pole-piece coils in a direction opposite to the magnetic action of the armature-current. The commutator-brushes are, as in the former case, represented as being adjusted to the points of least sparking.

Fig. 5 represents the form the magnetic lines take when the load is removed, from which it will be seen that the magnetic field has shifted back; or, in other words, owing to the current of the pole-piece coils (which are connected in series with the armature coils) coming very near to zero, there is no longer any perceptible distortion in the magnetic field. It will also be seen that the line of neutrality in the magnetic field has shifted to a position almost parallel to the line of commutation, which, when the motor is running without load, is of course the line of least sparking. The magnetic field will therefore always be automatically maintained in the positions of least sparking at the commutator brushes. Furthermore, it will be seen that the magnetic lines which were consumed in preventing sparking when the motor was working under load are consumed when the motor is working without load in setting up effective counter electro-motive force. It is evident, therefore, that the increase of speed necessary to set up sufficient counter electro-motive force to limit the required flow of current to the armature will be very slight and will answer for all ordinary commercial requirements of automatic regulation.

Since no contrary winding is required on the field-magnet, the weight and cost will be considerably less than the ordinary differentially-wound motor, or with the same weight the efficiency of the field-magnet could be greatly increased. It should be mentioned, however, that a small amount of contrary winding on the field-magnets might improve the regulation without greatly increasing the weight or cost of the machine. This combination of laminated field-magnet pole-pieces with distorting-coils applied thereto, is very efficient in both constant-potential and constant-current motors for automatically maintaining the non-sparking points, for there will be much less current expended and weight of wire required in the distorting-coils when combined with the laminated pole-pieces, from the fact that the magnetic action of the armature-current upon the pole-pieces is overcome or broken up by the laminations, and therefore it is not required to be counteracted by the supplementary coils, as will be readily understood.

I claim as my invention—

An electric motor having its field-magnet pole-piece faces laminated transversely to the direction of rotation of the armature, and having main coils on the cores and distorting-coils applied to the pole-pieces, substantially as and for the purpose set forth.

In testimony whereof I have signed my name to this specification in the presence of two subscribing witnesses.

DANIEL HIGHAM.

Witnesses:
WILLIAM D. CONNER,
HARRY SMITH.